(12) United States Patent
Feder et al.

(10) Patent No.: US 9,741,150 B2
(45) Date of Patent: Aug. 22, 2017

(54) SYSTEMS AND METHODS FOR DISPLAYING REPRESENTATIVE IMAGES

(71) Applicant: Duelight LLC, Sunnyvale, CA (US)

(72) Inventors: Adam Barry Feder, Mountain View, CA (US); William Guie Rivard, Menlo Park, CA (US); Brian J. Kindle, Sunnyvale, CA (US)

(73) Assignee: Duelight LLC, Sunnyvale, CA (US)

(*) Notice: Subject to any disclaimer, the term of this patent is extended or adjusted under 35 U.S.C. 154(b) by 0 days.

(21) Appl. No.: 14/340,557

(22) Filed: Jul. 24, 2014

(65) Prior Publication Data
US 2015/0029226 A1  Jan. 29, 2015

Related U.S. Application Data

(60) Provisional application No. 61/958,324, filed on Jul. 25, 2013.

(51) Int. Cl.
| | | |
|---|---|---|
| G09G 5/00 | (2006.01) | |
| G06T 13/80 | (2011.01) | |
| G06F 3/0346 | (2013.01) | |
| G06F 3/0484 | (2013.01) | |
| G06T 1/20 | (2006.01) | |

(52) U.S. Cl.
CPC ............ *G06T 13/80* (2013.01); *G06F 3/0346* (2013.01); *G06F 3/0484* (2013.01); *G06F 2200/1637* (2013.01); *G06T 1/20* (2013.01)

(58) Field of Classification Search
CPC ........... G06F 3/0346; G06F 2200/1637; G06F 3/0484; G06F 1/1622; G09G 2354/00; G09G 2340/0492; G06T 3/60; G06T 13/80; G06T 1/20; G06T 2200/24
See application file for complete search history.

(56) References Cited

U.S. PATENT DOCUMENTS

| | | | | |
|---|---|---|---|---|
| 5,734,760 A | * | 3/1998 | Yoshida .................... | G06T 3/60 358/1.18 |
| 5,835,639 A | * | 11/1998 | Honsinger ............ | G06T 7/0044 382/278 |
| 5,900,909 A | * | 5/1999 | Parulski ............... | H04N 1/2112 348/231.6 |
| 6,055,326 A | * | 4/2000 | Chang ................... | G06T 7/0042 378/20 |
| 6,115,025 A | | 9/2000 | Buxton et al. | |

(Continued)

OTHER PUBLICATIONS

Easy Flex, Two Examples of Layout Animations, Apr. 11, 2010, http://evtimmy.com/2010/04/two-examples-of-layout-animations/.*

(Continued)

*Primary Examiner* — Devona Faulk
*Assistant Examiner* — Charles L Beard
(74) *Attorney, Agent, or Firm* — Zilka-Kotab, P.C.

(57) ABSTRACT

A system, method, and computer program product for displaying representative images within a collection viewer is disclosed. The method comprises receiving a notification indicating a new orientation for the collection viewer, computing a current animation state for a current animation sequence associated with the collection viewer, identifying representative images to render in an animation frame, and generating an animation frame by rendering one or more rendered representative images in place, according to the animation state.

16 Claims, 7 Drawing Sheets

(56) References Cited

U.S. PATENT DOCUMENTS

| | | | |
|---|---|---|---|
| 6,137,468 A * | 10/2000 | Martinez | G06F 1/1616 345/649 |
| 6,326,978 B1 | 12/2001 | Robbins | |
| 6,704,007 B1 | 3/2004 | Clapper | |
| 6,842,265 B1 * | 1/2005 | Votipka | H04N 1/00241 358/1.16 |
| 7,027,054 B1 * | 4/2006 | Cheiky | H04N 5/262 345/473 |
| 7,030,868 B2 | 4/2006 | Clapper | |
| 7,030,912 B1 * | 4/2006 | Honma | H04N 5/225 348/222.1 |
| 7,085,590 B2 | 8/2006 | Kennedy et al. | |
| 7,352,361 B2 * | 4/2008 | Yi | G06F 1/1626 345/158 |
| 7,626,598 B2 | 12/2009 | Manchester | |
| 7,646,417 B2 * | 1/2010 | Goto | G06F 1/162 348/333.06 |
| 7,730,422 B2 | 6/2010 | Russo | |
| 7,903,115 B2 * | 3/2011 | Platzer | G06F 3/0485 345/473 |
| 8,068,121 B2 * | 11/2011 | Williamson | G06F 1/1626 345/619 |
| 8,125,499 B2 * | 2/2012 | Yamada | H04N 1/0044 345/659 |
| 8,233,003 B2 * | 7/2012 | Obinata | G09G 3/3611 345/555 |
| 8,314,817 B2 * | 11/2012 | Williamson | G06F 1/1626 345/619 |
| 8,581,935 B2 | 11/2013 | Handa | |
| 8,610,724 B2 * | 12/2013 | Garg | G06T 13/80 345/418 |
| 8,692,851 B2 | 4/2014 | Ording et al. | |
| 8,717,293 B2 | 5/2014 | Wong et al. | |
| 8,817,048 B2 | 8/2014 | Kerr et al. | |
| 8,854,325 B2 | 10/2014 | Byrd et al. | |
| 8,872,855 B2 * | 10/2014 | Doll | G09G 5/14 345/649 |
| 8,896,632 B2 * | 11/2014 | MacDougall | G06F 1/1626 345/173 |
| 8,915,437 B2 * | 12/2014 | Hoshino | G02B 5/3016 235/380 |
| 8,933,960 B2 * | 1/2015 | Lindahl | G06F 1/1626 345/619 |
| 8,937,735 B2 * | 1/2015 | Mori | G06F 3/1204 358/1.1 |
| 8,947,382 B2 | 2/2015 | Winkler et al. | |
| 8,988,349 B2 | 3/2015 | Alberth et al. | |
| 9,070,229 B2 * | 6/2015 | Williamson | G06F 1/1626 |
| 9,098,069 B2 | 8/2015 | Dickinson et al. | |
| 9,129,550 B2 | 9/2015 | Doll | |
| 9,144,714 B2 * | 9/2015 | Hollinger | H04N 5/2252 |
| 9,158,492 B2 * | 10/2015 | Miyata | G06F 3/1205 |
| 9,177,362 B2 * | 11/2015 | Restrepo | G06T 3/606 |
| 9,189,069 B2 | 11/2015 | Hinckley | |
| 9,196,076 B1 * | 11/2015 | MacLeod | G06T 13/80 |
| 9,215,405 B2 * | 12/2015 | Atkinson | H04N 21/4223 |
| 9,232,124 B2 * | 1/2016 | Song | H04N 5/2251 |
| 9,256,974 B1 * | 2/2016 | Hines | G06F 3/0346 |
| 9,261,909 B2 | 2/2016 | Lam | |
| 9,298,745 B2 * | 3/2016 | Lee | G06F 3/04817 |
| 9,383,202 B2 * | 7/2016 | Zhou | G01C 5/06 |
| 9,417,836 B2 * | 8/2016 | Postal | G06F 3/1446 |
| 9,424,798 B2 * | 8/2016 | Park | G09G 5/00 |
| 9,459,781 B2 * | 10/2016 | Wilson | G06F 3/04845 |
| 9,489,927 B2 * | 11/2016 | Aizawa | G09G 5/38 |
| 9,507,445 B2 * | 11/2016 | Sutton | G06F 3/0362 |
| 9,591,225 B2 * | 3/2017 | Jung | H04N 5/23293 |
| 9,628,647 B2 * | 4/2017 | Tomono | H04N 1/00413 |
| 2002/0063714 A1 | 5/2002 | Haas | G06F 17/30017 345/473 |
| 2004/0150622 A1 * | 8/2004 | Bohn | G06F 3/0312 345/163 |
| 2004/0184115 A1 * | 9/2004 | Suzuki | H04N 1/0035 358/474 |
| 2005/0104848 A1 * | 5/2005 | Yamaguchi | G06F 1/1626 345/156 |
| 2005/0143124 A1 * | 6/2005 | Kennedy | G06F 1/1626 455/556.1 |
| 2005/0154798 A1 | 7/2005 | Nurmi | |
| 2005/0237587 A1 * | 10/2005 | Nakamura | H04N 1/00347 358/527 |
| 2006/0026535 A1 | 2/2006 | Hotelling et al. | |
| 2006/0029292 A1 * | 2/2006 | Hagiwara | G06K 9/3208 382/296 |
| 2006/0033760 A1 * | 2/2006 | Koh | G09G 5/363 345/649 |
| 2006/0039630 A1 * | 2/2006 | Kotani | G06T 3/60 382/298 |
| 2006/0133695 A1 * | 6/2006 | Obinata | G06T 1/60 382/296 |
| 2007/0004451 A1 | 1/2007 | Anderson | |
| 2007/0045433 A1 * | 3/2007 | Chapman | F23N 5/022 236/46 R |
| 2007/0136208 A1 * | 6/2007 | Hamashima | B41J 3/44 705/62 |
| 2007/0236515 A1 * | 10/2007 | Montague | G06F 3/04845 345/649 |
| 2007/0236709 A1 * | 10/2007 | Mitani | G03G 15/507 358/1.6 |
| 2008/0001945 A1 * | 1/2008 | Kashito | G11B 27/034 345/418 |
| 2008/0043032 A1 * | 2/2008 | Mamona | G06T 3/606 345/582 |
| 2008/0076481 A1 * | 3/2008 | Iwasaki | G06T 3/60 455/566 |
| 2008/0165144 A1 | 7/2008 | Forstall et al. | |
| 2008/0266326 A1 | 10/2008 | Porwal | |
| 2009/0002335 A1 | 1/2009 | Chaudhri | |
| 2009/0002391 A1 * | 1/2009 | Williamson | G06F 1/1626 345/619 |
| 2009/0002395 A1 * | 1/2009 | Yamada | H04N 1/0044 345/649 |
| 2009/0058882 A1 * | 3/2009 | Adachi | G06F 1/1622 345/650 |
| 2009/0262074 A1 * | 10/2009 | Nasiri | A63F 13/06 345/158 |
| 2010/0007603 A1 * | 1/2010 | Kirkup | G06F 1/1616 345/158 |
| 2010/0066763 A1 * | 3/2010 | MacDougall | G06F 1/1626 345/656 |
| 2010/0118115 A1 * | 5/2010 | Takahashi | H04N 1/00291 348/24 |
| 2010/0123929 A1 * | 5/2010 | Yoshimoto | H04N 1/0035 358/1.15 |
| 2010/0149377 A1 * | 6/2010 | Shintani | H04N 5/232 348/231.5 |
| 2010/0218113 A1 * | 8/2010 | White | G06F 1/1626 715/746 |
| 2010/0302278 A1 | 12/2010 | Shaffer et al. | |
| 2010/0302408 A1 * | 12/2010 | Ito | H04N 1/0035 348/231.99 |
| 2010/0315656 A1 * | 12/2010 | Agata | G06F 3/1208 358/1.2 |
| 2010/0317332 A1 | 12/2010 | Bathiche et al. | |
| 2010/0333044 A1 * | 12/2010 | Kethireddy | G06F 3/0481 715/863 |
| 2011/0074973 A1 * | 3/2011 | Hayashi | H04N 5/232 348/222.1 |
| 2011/0090256 A1 | 4/2011 | Manchester | |
| 2011/0167382 A1 | 7/2011 | van Os | |
| 2011/0193982 A1 * | 8/2011 | Kook | H04N 5/23293 348/222.1 |
| 2011/0261075 A1 * | 10/2011 | Tanaka | G09G 5/14 345/649 |
| 2011/0298982 A1 * | 12/2011 | Kobayashi | G06T 3/40 348/581 |
| 2011/0310094 A1 * | 12/2011 | Park | G06F 1/1626 345/419 |

(56) References Cited

U.S. PATENT DOCUMENTS

| | | | | |
|---|---|---|---|---|
| 2012/0001943 | A1* | 1/2012 | Ishidera | G06F 3/0346 345/659 |
| 2012/0033262 | A1* | 2/2012 | Sakurai | G06F 1/1694 358/1.15 |
| 2012/0081382 | A1* | 4/2012 | Lindahl | G06T 11/00 345/581 |
| 2012/0139904 | A1* | 6/2012 | Lee | G06F 3/04817 345/419 |
| 2012/0154276 | A1* | 6/2012 | Shin | G06F 3/017 345/158 |
| 2012/0162263 | A1* | 6/2012 | Griffin | G06F 1/1624 345/652 |
| 2012/0176413 | A1* | 7/2012 | Kulik | G06F 1/1626 345/659 |
| 2012/0206488 | A1* | 8/2012 | Wong | G06F 3/147 345/649 |
| 2012/0229370 | A1* | 9/2012 | Stroffolino | G09G 3/20 345/156 |
| 2012/0250082 | A1* | 10/2012 | Mori | G06F 3/1204 358/1.15 |
| 2012/0294533 | A1* | 11/2012 | Ikenoue | H04N 1/3877 382/195 |
| 2012/0299964 | A1* | 11/2012 | Homma | G06F 1/1694 345/649 |
| 2012/0324400 | A1* | 12/2012 | Caliendo | G06F 9/4443 715/835 |
| 2013/0069989 | A1* | 3/2013 | Nagata | G09G 3/20 345/659 |
| 2013/0141464 | A1* | 6/2013 | Hunt | G06F 1/1626 345/659 |
| 2013/0176222 | A1 | 7/2013 | Tanaka | |
| 2013/0222231 | A1* | 8/2013 | Gardenfors | G06F 3/03 345/156 |
| 2013/0222516 | A1* | 8/2013 | Do | H04N 7/147 348/14.01 |
| 2013/0222646 | A1* | 8/2013 | Tsubota | H04N 5/23293 348/239 |
| 2013/0335317 | A1* | 12/2013 | Liu | G06T 3/60 345/156 |
| 2014/0063611 | A1* | 3/2014 | Raymond | B42D 15/00 359/619 |
| 2014/0078171 | A1* | 3/2014 | Miyatake | G06T 13/00 345/619 |
| 2014/0085339 | A1* | 3/2014 | Brady | G06T 3/60 345/649 |
| 2014/0085430 | A1* | 3/2014 | Komori | G03B 17/18 348/47 |
| 2014/0111548 | A1* | 4/2014 | Shin | G09G 5/32 345/650 |
| 2014/0177008 | A1* | 6/2014 | Raymond | B42D 25/324 358/3.28 |
| 2014/0210754 | A1* | 7/2014 | Ryu | G06F 3/017 345/173 |
| 2014/0215365 | A1* | 7/2014 | Hiraga | G06F 3/04883 715/765 |
| 2014/0240453 | A1* | 8/2014 | Kim | H04N 5/2258 348/38 |
| 2014/0240543 | A1* | 8/2014 | Kim | H04N 5/2258 348/231.99 |
| 2014/0258674 | A1* | 9/2014 | Kim | G06F 12/1027 711/204 |
| 2014/0340428 | A1* | 11/2014 | Shibayama | G06T 1/20 345/659 |
| 2014/0359517 | A1* | 12/2014 | Elings | G06F 3/0483 715/776 |
| 2015/0042669 | A1* | 2/2015 | Van Nostrand | G09G 5/395 345/545 |
| 2015/0070458 | A1* | 3/2015 | Kim | G06T 3/60 348/14.07 |
| 2015/0091945 | A1* | 4/2015 | Uratani | G06T 3/606 345/649 |
| 2015/0095775 | A1* | 4/2015 | Lewis | G11B 27/00 715/716 |
| 2015/0193912 | A1* | 7/2015 | Yuasa | G09G 5/00 345/659 |
| 2015/0215532 | A1* | 7/2015 | Jafarzadeh | H04N 5/23238 348/36 |
| 2015/0278853 | A1* | 10/2015 | McLaughlin | G06Q 30/0248 705/14.47 |
| 2015/0302587 | A1* | 10/2015 | Hirano | G06K 9/00208 348/142 |
| 2015/0339002 | A1* | 11/2015 | Arnold | G06F 3/0481 715/854 |
| 2015/0339006 | A1* | 11/2015 | Chaland | G06F 3/0482 715/835 |
| 2015/0341536 | A1* | 11/2015 | Huang | H04N 5/2328 348/208.2 |
| 2016/0026658 | A1* | 1/2016 | Krishnaraj | G06F 3/016 715/702 |
| 2016/0034166 | A1* | 2/2016 | Wilson | G06F 3/04842 715/771 |
| 2016/0034167 | A1* | 2/2016 | Wilson | G06F 3/04845 715/771 |
| 2016/0062645 | A1* | 3/2016 | Masuko | G09G 5/00 345/173 |
| 2016/0148648 | A1* | 5/2016 | Dimson | H04N 5/222 386/280 |
| 2016/0163289 | A1* | 6/2016 | Masuko | G06F 1/1686 345/659 |
| 2016/0170608 | A1* | 6/2016 | Zambetti | G06F 3/04817 715/810 |
| 2016/0173782 | A1* | 6/2016 | Dimson | G11B 27/031 386/226 |
| 2016/0202866 | A1* | 7/2016 | Zambetti | G06F 3/0485 715/835 |
| 2016/0202872 | A1* | 7/2016 | Jang | G06F 3/0346 715/728 |
| 2016/0275650 | A1* | 9/2016 | Case | G06T 3/606 |
| 2016/0330383 | A1* | 11/2016 | Oyama | H04N 5/2355 |
| 2016/0344927 | A1* | 11/2016 | Brasket | H04N 5/23219 |
| 2016/0357420 | A1* | 12/2016 | Wilson | G06F 3/04847 |

OTHER PUBLICATIONS

Tidwell, J., "Animated Transition," from Designing Interfaces, O'Reilly Media, Inc., Dec. 2010, pp. 127-129.

Rivard, W. et al., U.S. Appl. No. 15/331,733, Oct. 21, 2016.

Notice of Allowance from U.S. Appl. No. 15/331,733, dated Dec. 7, 2016.

Notice of Allowance from U.S. Appl. No. 15/331,733, dated Apr. 17, 2017.

* cited by examiner

SYSTEMS AND METHODS FOR DISPLAYING REPRESENTATIVE IMAGES

CROSS-REFERENCES TO RELATED APPLICATIONS

The present application claims priority to U.S. Provisional Application No. 61/958,324, titled "Systems and methods for digital photography," filed Jul. 25, 2013, which is hereby incorporated by reference for all purposes.

FIELD OF THE INVENTION

Embodiments of the present invention relate generally to user interface design, and more specifically to systems and methods for displaying representative images.

BACKGROUND

A typical mobile computing device, or simply "mobile device," such as a smartphone or tablet computer, includes a computation subsystem, and a display screen configured to display a user interface (UI) comprising elements such as control widgets and representative images of files accessible through the UI. A representative image may comprise a thumbnail image associated with an application, script, or data file residing within a file system or file database. One example of a representative image is an image thumbnail. Another example of a representative image is a file icon. Representative images are typically presented to a user within a collection viewer that is configured to allow the user to browse, select, view, execute, and otherwise interact with corresponding objects. One example of a collection viewer is a file browser, which may be configured to show users a list of files within a file system depicted as icons. Another example of a collection viewer is an image browser, configured to show users a list of images within a file system or image database depicted as thumbnails.

A UI for a mobile device typically includes a collection viewer for files and may include a collection viewer for images. A collection viewer for digital images may similarly present thumbnails associated with digital images residing within an image database or within a file system folder of digital images. The collection viewer enables the user to browse thumbnails, and to open a digital image by performing a touch gesture on a corresponding thumbnail.

Mobile computing devices, or simply "mobile devices" may include an arbitrarily large number of files and corresponding icons that need to be presented within a collection viewer for files. Similarly, mobile devices may include an arbitrarily large number of digital images and corresponding thumbnails that need to be presented within a collection viewer for digital images. Typical collection viewers enable users to view a collection of representative images as a two-dimensional grid of representative images. The representative images are conventionally positioned within the grid according to a specific sequence, such as a file sequence number, a sort sequence number, or an image sequence number. The grid is populated with representative images frequently forming a tall, narrow form factor regardless of device orientation. Width of the grid is associated with horizontal screen width, which may be different in landscape versus portrait orientations. As a consequence, the physical location of a specific representative image may change when device orientation changes because the collection viewer typically needs to alter the grid layout and specific sequence of the representative images.

In conventional operation of a collection viewer, the user may locate a desired representative image by scrolling the grid vertically into an appropriate screen position. However, if the user then rotates their mobile device, the screen position of the desired representative image typically changes in response to the change in grid width, forcing the user to once again locate their desired representative image within the grid. Forcing the user to locate the desired representative image a second time after rotation introduces inefficiency and confusion in the user experience.

As the foregoing illustrates, there is a need for addressing this and/or other related issues associated with the prior art.

SUMMARY

A system, method, and computer program product for displaying representative images within a collection viewer is disclosed. The method comprises receiving a notification indicating a new orientation for the collection viewer, computing a current animation state for a current animation sequence associated with the collection viewer, identifying representative images to render in an animation frame, and generating an animation frame by rendering one or more rendered representative images in place, according to the animation state.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention enable a mobile device to present a consistent location of representative images regardless of device orientation within a user interface (UI). A collection viewer refers to a collection of software modules that generate a depiction of data objects within a UI. Displayed UI elements generated by the software modules may also be referred to generally as a collection viewer. A collection viewer is configured to present representative images of the data objects, such as file icons and image thumbnails to a user. A collection viewer may comprise a file browser, an image browser, or any other type of data object browser configured to depict data objects as representative images. When the user rotates the mobile device, the collection viewer generates an in-place rotation animation for each representative image. Keeping each representative image in substantially the same physical screen location regardless of device orientation allows the user to visually track a given representative image through device rotation, thereby providing a more efficient and intuitive user experience. Animating rotation of the representative images to maintain proper viewing orientation provides an intuitive visual cue, further improving the user experience.

Figure 1:
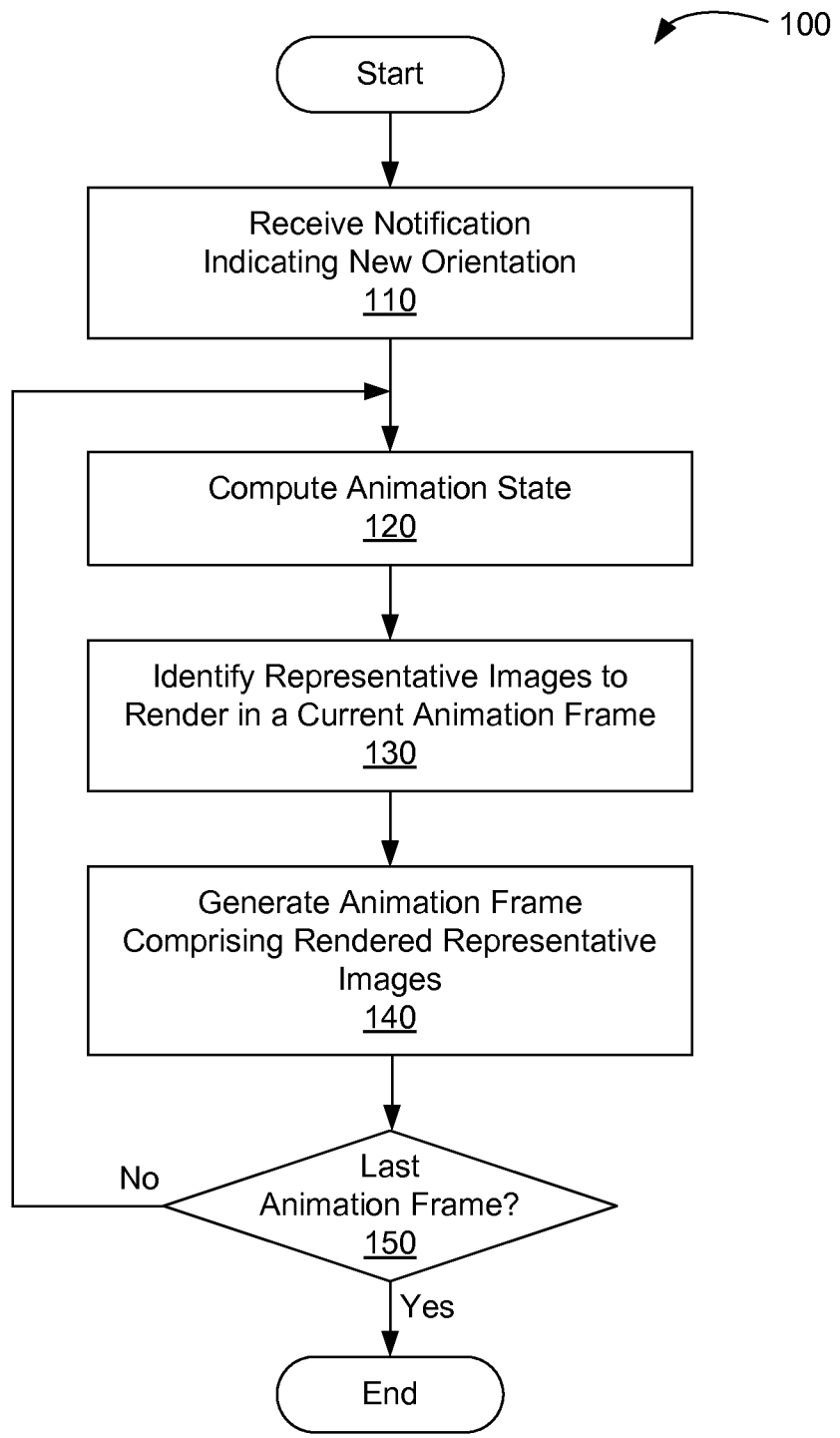
FIG. 1 illustrates a flow chart of a method for displaying a collection of representative images, according to one embodiment of the present invention.
Figure 2A:
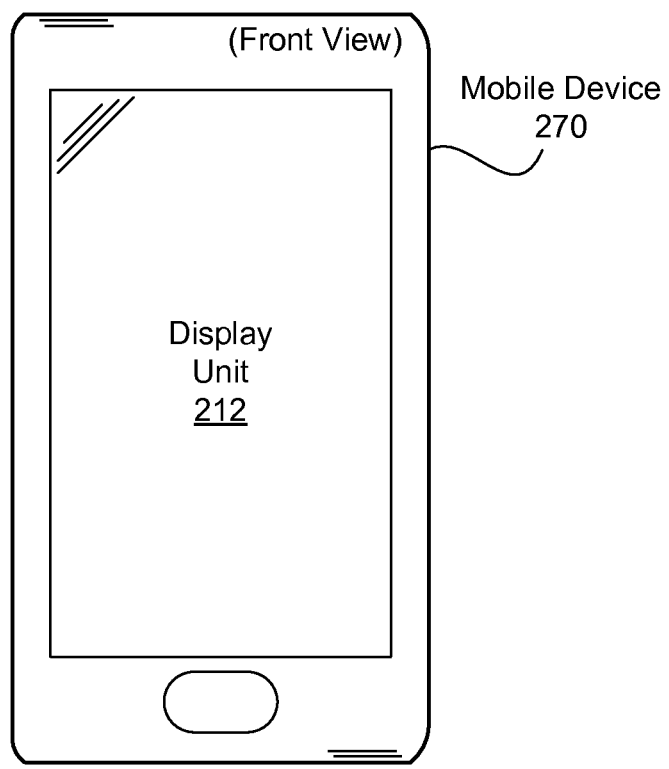
FIG. 2A illustrates a front view of a mobile device comprising a display unit, according to one embodiment of the present invention.
Figure 2B:
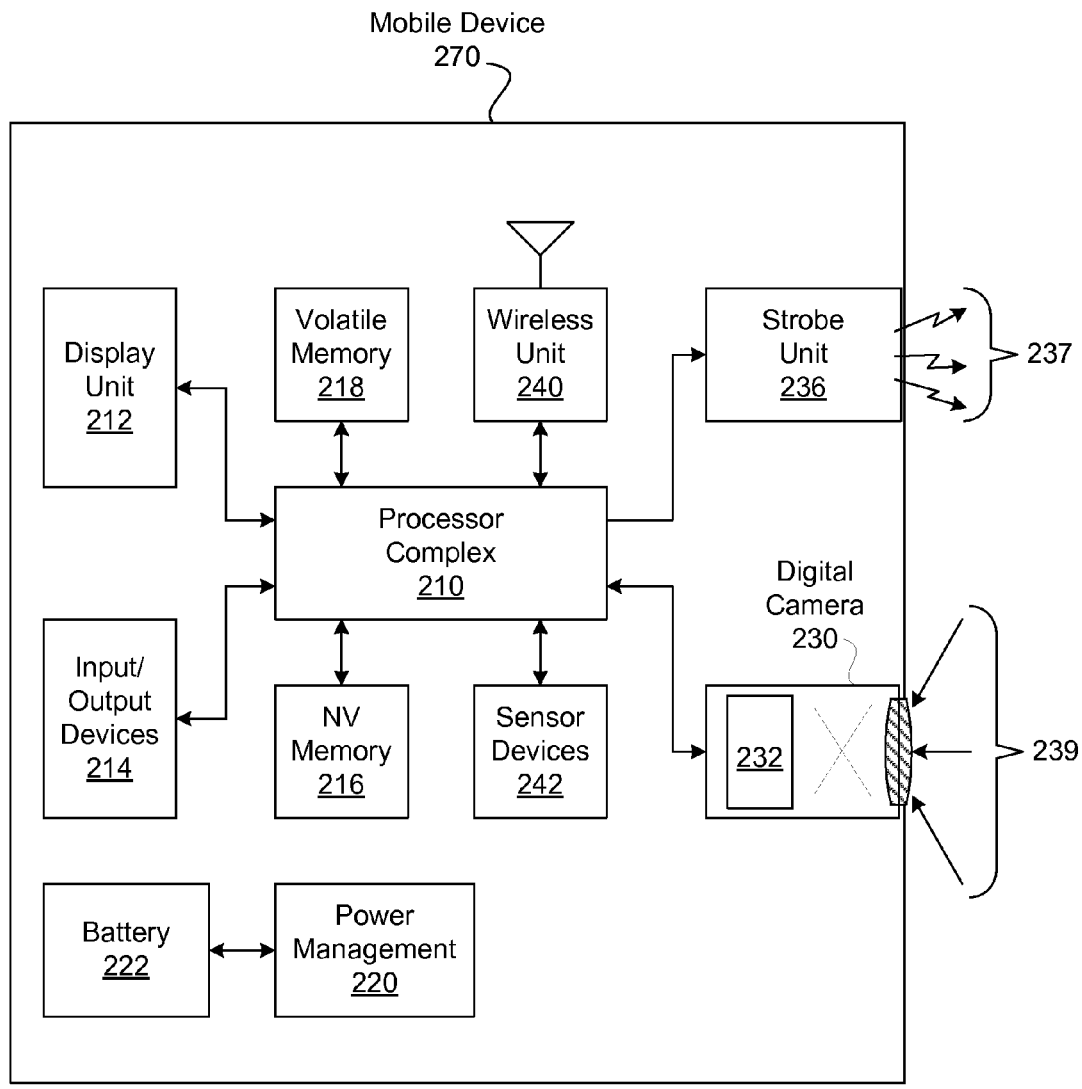
FIG. 2B illustrates a block diagram of a mobile device comprising a display unit, according to one embodiment of the present invention.

FIG. 1A illustrates a flow chart of a method 100 for displaying a collection of representative images, according to one embodiment of the present invention. Although method 100 is described in conjunction with the systems of FIGS. 2A-2B, persons of ordinary skill in the art will understand that any system that performs method 100 is within the scope and spirit of embodiments of the present invention. In one embodiment, a mobile device, such as mobile device 270 of FIGS. 2A-2B, is configured to perform method 100 by executing a collection viewer, implemented as a software module within mobile device 270.

Method 100 begins in step 110, where the collection viewer receives a notification indicating that the mobile device has been repositioned into a new orientation. In one embodiment, the notification indicates one of four orthogonal orientations, where a first orientation is associated with a generally upright portrait orientation, a second orientation is associated a clockwise rotation from the first orientation to a landscape orientation, a third orientation is associated with an upside down portrait orientation, and a fourth orientation is associated a counterclockwise rotation from the first orientation to a landscape orientation. Each of the four orientations represents an approximation of a physical orientation of the mobile device to the nearest ninety degrees. In other embodiments, the approximation of a physical orientation may comprise angular increments of less than ninety degrees to provide a finer approximation granularity. In certain embodiments, angular increments are substantially uniform, while in other embodiments, angular increments are non-uniform.

In one embodiment, physical orientation is generated from measurements performed by a sensor device, such as one of sensor devices 242. For example, an accelerometer, comprising sensor devices 242, may provide a physical measurement of a force vector corresponding to physical forces on the mobile device. When mobile device is held generally still, such as when a user is holding the mobile device, this measured force vector is generally aligned with a gravity force vector. When the measured force vector is aligned vertically and pointing from the top of the mobile device to the bottom of the mobile device, the mobile device is likely being held in an upright portrait orientation. When the measured force vector is rotated by approximately ninety degrees about a normal vector to display unit 212, the device is likely being held in a landscape orientation, and so forth. While approximating orientation is described herein based on a measured force vector, other techniques of approximating orientation may be performed without departing the scope and spirit of embodiments of the present invention.

Any technically feasible technique may be implemented for sending a notification to the collection viewer. For example, the notification may comprise a message in an object message passing system. In this example, an instance of the collection viewer is configured to receive a new orientation message when the mobile device changes to a new orientation. A software module, such as a system service module, is configured to approximate device orientation, for example, by monitoring an accelerometer within sensor devices 242. The new orientation message may specify a new orientation, or the new orientation message may specify that the device is in a new orientation and trigger the collection viewer to determine the new orientation. The new orientation message may indicate that the device has changed orientation beyond a specified angular threshold, enabling the collection viewer to determine an orientation for display, such as in embodiments that implement finer rotational granularity than ninety degree granularity. The system service module may include a kernel process configured to monitor hardware circuits comprising the sensor devices 242, an application programming interface (API) configured to respond to the kernel process, a process executing in application space that is configured to monitor sensor devices 242 and generate messages based on specified criteria, or any other technically feasible mechanism for providing orientation notifications to the collection viewer.

In one embodiment, hysteresis is applied to an orientation approximation, so that a change in physical orientation needs to surpass a certain rotational threshold to trigger generation of the notification of a new orientation. In such an embodiment, the system services module applies hysteresis to physical orientation measurements so that a notification is generated only after a specified orientation threshold is exceeded. In other embodiments, the collection viewer is configured to apply hysteresis to notifications, such as notifications for changes of less than ninety degrees or less than an orientation change threshold.

In step 120, the collection viewer, or a helper function to the collection viewer, computes a current animation state for a current animation sequence. A current animation sequence may include a scroll animation, a rotation animation, or a combination thereof triggered by a physical change in device orientation. A given current animation sequence is initiated in response to receiving the notification. In one embodiment, the current animation sequence defines a sequence of frames, as discussed in greater detail below in FIG. 3E. In one embodiment, a given animation sequence completed before a subsequent animation sequence is initiated. The current animation state may define a current scroll position and a current rotation angle for a collection of representative images being animated in the current animation sequence. The current animation state may determine which representative images are visible within view panel 311.

In step 130, the collection viewer, or a helper function to the collection viewer, identifies representative images to render in a current animation frame. Any technically feasible technique may be used to identify representative images to render. In one embodiment, only visible representative images are identified to render in the current frame. In one embodiment, a visible representative image includes geometry that intersects at least one pixel within view panel 311. In another embodiment, visible representative images and at least one non-visible representative image are identified to render in a current animation frame. In one embodiment, when a representative image is newly visible in a current animation frame, that representative image is instantiated for display and the instantiated representative image instance is sent a message to render an associated representative image according to the current animation state. Other representative image instances may be sent a substantially similar message to render an associated representative image according to the current animation state. In certain embodiments, a representative image instance that is no longer visible is de-allocated at the completion of the animation sequence.

In step 140, the collection viewer, or a helper function to the collection viewer, generates an animation frame comprising rendered representative images. In one embodiment, the animation frame includes one rendered representative image. In another embodiment, the animation frame includes two or more rendered representative images. Each rendered representative image includes a representative image that has been translated, rotated, or both translated and rotated in accordance with the current animation state. At least a portion of each rendered representative image may be presented within view panel 311. In one embodiment, the generated animation frame is displayed on display unit 212 of FIG. 2A. In one embodiment, each animation frame is rendered by a graphics processing unit (GPU) within processor complex 210 of FIG. 2B.

If, in step 150, the current animation frame is the last animation frame, then the method terminates. Otherwise, the method proceeds back to step 120.

System Overview

FIG. 2A illustrates a front view of a mobile device 270 comprising a display unit 212, according to one embodiment of the present invention. Display unit 212 is configured to display user interface (UI) elements associated with software applications configured to execute on mobile device 270. The UI elements may include representative images, such as file icons and image thumbnails.

FIG. 2B illustrates a block diagram of mobile device 270, according to one embodiment of the present invention. Mobile device 270 includes a processor complex 210 coupled to display unit 212. Mobile device 270 may also include, without limitation, a digital camera 230, a strobe unit 236, a set of input/output devices 214, non-volatile memory 216, volatile memory 218, a wireless unit 240, and sensor devices 242, each coupled to processor complex 210. In one embodiment, a power management subsystem 220 is configured to generate appropriate power supply voltages for each electrical load element within mobile device 270, and a battery 222 is configured to supply electrical energy to power management subsystem 220. Battery 222 may implement any technically feasible battery, including primary or rechargeable battery technologies. Alternatively, battery 222 may be implemented as a fuel cell, or high capacity electrical capacitor.

In one usage scenario, strobe illumination 237 comprises at least a portion of overall illumination in a scene being photographed by digital camera 230. Optical scene information 239, which may include strobe illumination 237 reflected from objects in the scene, is focused onto an image sensor 232 as an optical image. Image sensor 232, within digital camera 230, generates an electronic representation of the optical image. The electronic representation comprises spatial color intensity information, which may include different color intensity samples for red, green, and blue light.

Display unit 212 is configured to display a two-dimensional array of pixels to form a digital image for display. Display unit 212 may comprise a liquid-crystal display, an organic LED display, or any other technically feasible type of display. Input/output devices 214 may include, without limitation, a capacitive touch input surface, a resistive tablet input surface, buttons, knobs, or any other technically feasible device for receiving user input and converting the input to electrical signals. In one embodiment, display unit 212 and a capacitive touch input surface comprise a touch entry display system, and input/output devices 214 comprise a speaker and microphone.

Non-volatile (NV) memory 216 is configured to store data when power is interrupted. The NV memory 216 therefore implements a non-transitory computer-readable medium. In one embodiment, NV memory 216 comprises one or more flash memory devices. NV memory 216 may be configured to include programming instructions for execution by one or more processing units within processor complex 210. The programming instructions may include, without limitation, an operating system (OS), user interface (UI) modules, imaging processing and storage modules, and modules implementing one or more embodiments of techniques taught herein. In particular, the NV memory 216 may be configured to store instructions that implement method 100 of FIG. 1. The instructions, when executed by processing units within processor complex 210, cause the processing units to perform method 100. One or more memory devices comprising NV memory 216 may be packaged as a module that can be installed or removed by a user. In one embodiment, volatile memory 218 comprises dynamic random access memory (DRAM) configured to temporarily store programming instructions, image data, and the like needed during the course of normal operation of mobile device 270. Sensor devices 242 include sensors configured to detect at least device orientation of the mobile device 270. For example sensor devices 242 may include an accelerometer to detect motion and orientation, an electronic gyroscope to detect motion and orientation, or a combination thereof. Sensor devices 242 may also include, without limitation, a magnetic flux detector to detect orientation, a global positioning system (GPS) module to detect geographic position, or any combination thereof.

Wireless unit 240 may include one or more digital radios configured to send and receive digital data. In particular, wireless unit 240 may implement wireless standards known in the art as "WiFi" based on institute for electrical and electronics engineers (IEEE) standard 802.11, and may implement digital cellular telephony standards for data communication such as the well-known "3G" and long term evolution ("LTE"), or "4G" suites of standards. In one embodiment, mobile device 270 is configured to transmit one or more digital photographs residing within either NV memory 216 or volatile memory 218 to an online photographic media service via wireless unit 240. In such an embodiment, a user may possess credentials to access the online photographic media service and to transmit the one or more digital photographs for storage and presentation by the online photographic media service. The credentials may be stored or generated within mobile device 270 prior to transmission of the digital photographs. The online photographic media service may comprise a social networking service, photograph sharing service, or any other web-based service that provides storage and download of digital photographs. In certain embodiments, mobile device 270 is configured to receive one or more incoming digital photographs via wireless unit 240, and store the incoming digital photographs in the NV memory 216, or the volatile memory 218, or a combination thereof.

Collection Viewer

Figure 3A:
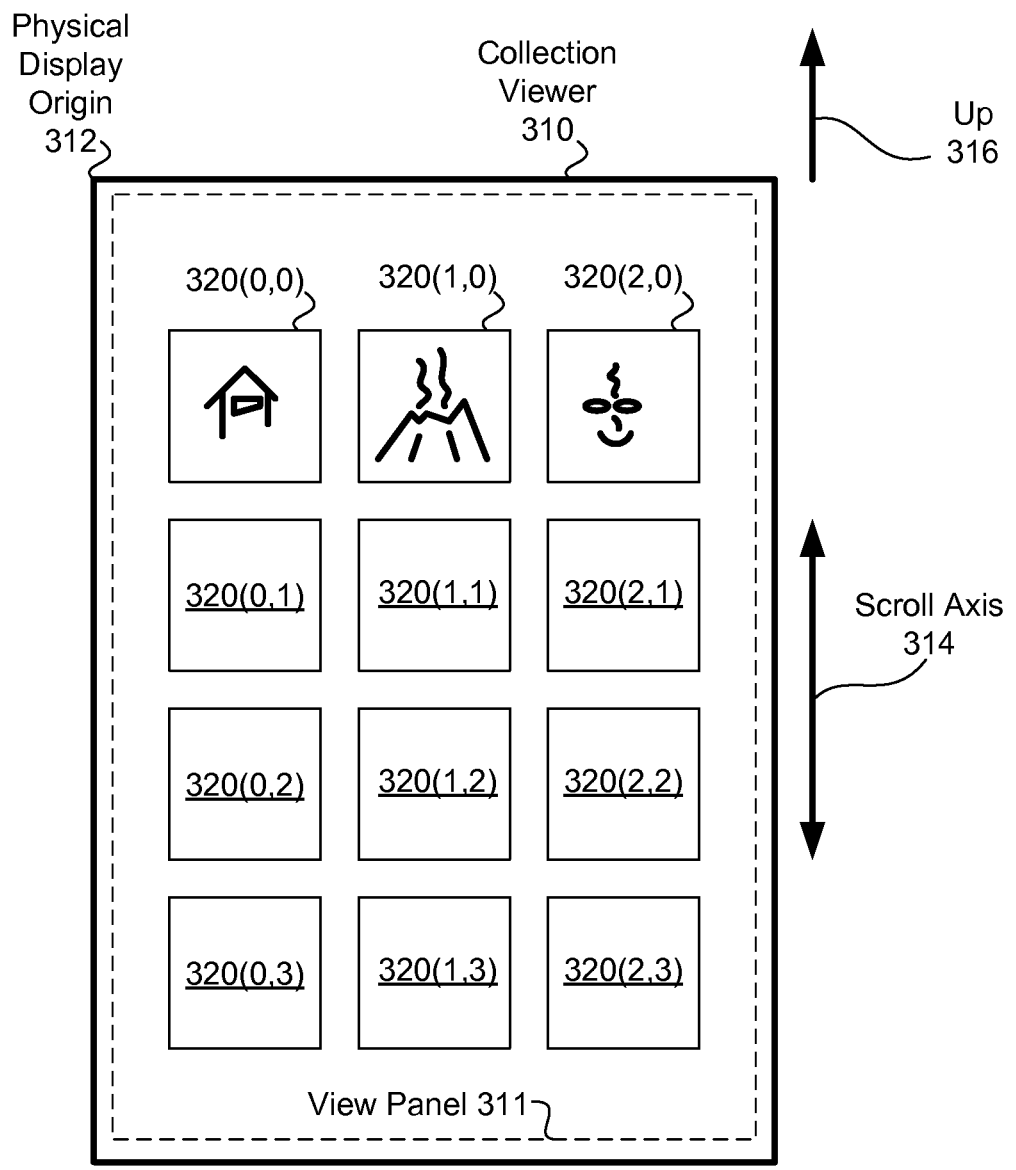
FIG. 3A illustrates a collection viewer configured in a portrait orientation, according to one embodiment of the present invention.

FIG. 3A illustrates a collection viewer 310 configured in a portrait orientation, according to one embodiment of the present invention. As shown, a physical display origin 312 is disposed in an upper left corner, and a scroll axis 314 is aligned vertically. That is, the scroll axis 314 is generally aligned with respect to a physical "up" direction 316.

In one embodiment, collection viewer 310 allows a user to scroll a collection of representative images 320, along scroll axis 314 in response to an input scroll command. The collection of representative images 320 may be organized in a grid, with a portion of the representative images 320 visible within a view panel 311. A swipe gesture performed on a capacitive input device within display unit 212 may serve as the input scroll command. In one embodiment, view panel 311 is configured to have a rectangular form, including a larger dimension and a smaller dimension. In such an embodiment, the term "portrait orientation" refers to an orientation for view panel 311 with the larger dimension generally oriented along the up direction 316. The term "landscape orientation" refers to an orientation for view panel 311 with the smaller dimension generally oriented along the up direction 316. In other embodiments, view panel 311 may be square. In such embodiments, "portrait orientation" and "landscape orientation" comprise arbitrary but orthogonal orientations of view panel 311.

While collection viewer 310 is illustrated here as a UI element having a view panel 311, the term "collection viewer" is defined broadly herein to include a software module configured to generate the UI element and display representative images 320 within view panel 311.

When a user rotates mobile device 270 into a new position, the collection viewer may reconfigure presentation of representative images 320 by causing the representative images 320 to rotate to an angle consistent with the new position. For example, the user may initially hold mobile device 270 in a portrait orientation. The user may then rotate the device orientation into a landscape orientation. In this example, mobile device 270 may detect a sufficient change in orientation and cause collection viewer 310 to transition from a portrait orientation to a landscape orientation, illustrated below in FIG. 3B. In other embodiments, different orientations may be implemented according to arbitrary angles having finer granularity than orthogonal angles. Detecting a sufficient change may include a hysteresis function in device orientation.

Figure 3B:
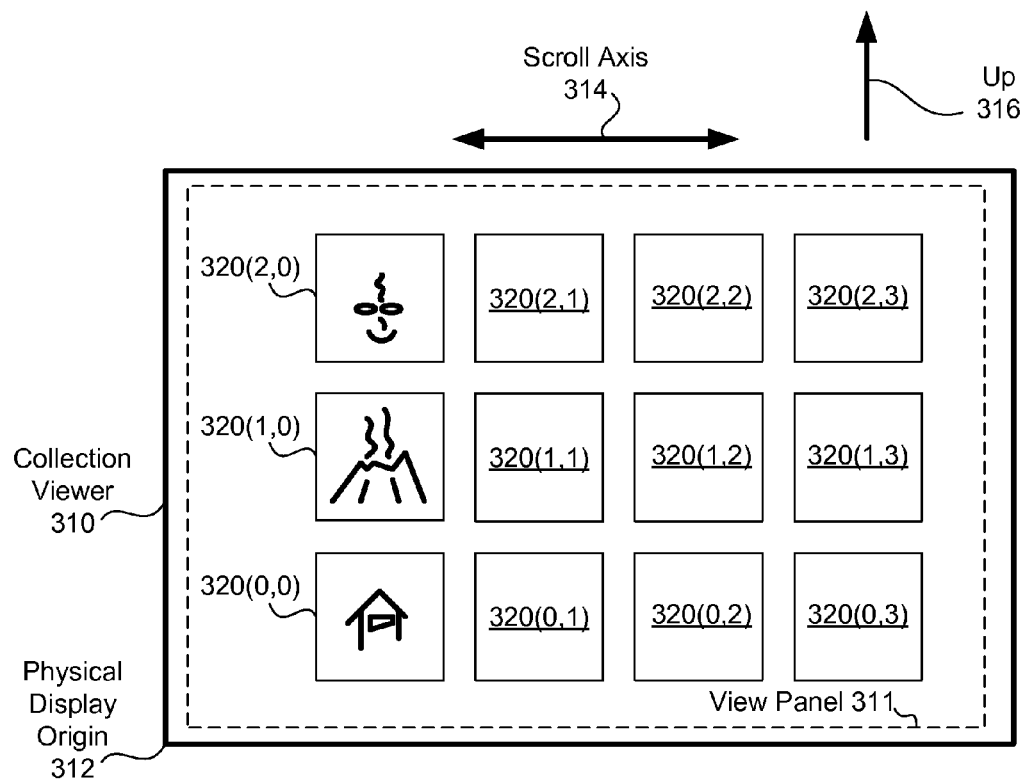
FIG. 3B illustrates a collection viewer configured in a landscape orientation, according to one embodiment of the present invention.

FIG. 3B illustrates collection viewer 310 configured in a landscape orientation, according to one embodiment of the present invention. As shown, the physical display origin 312 is disposed in a lower left corner, and a scroll axis 314 is aligned horizontally.

In a typical usage scenario, a user holds their head in an upright position, and therefore prefers to view representative images 320 rendered according to the physical up direction 316. As shown, representative images 320 are rotated to be viewed in an orientation consistent with the up direction 316. In one embodiment, representative images 320 are rotated in place. In one embodiment, rotation in place comprises performing an animation, such as a rotation animation, fade animation, or other transition animation, for each representative image 320. In one embodiment, animation for all representative images 320 is performed substantially synchronously, so that all displayed representative image 320 appear to move together. By rotating representative images 320 in place, collection viewer 310 is able to present a physical metaphor of the representative images 320 that is consistent with a physical device rotation. By contrast, prior art systems typically rearrange thumbnails, leading to user confusion and breaking any perceived consistency with physical device rotation.

Figure 3C:
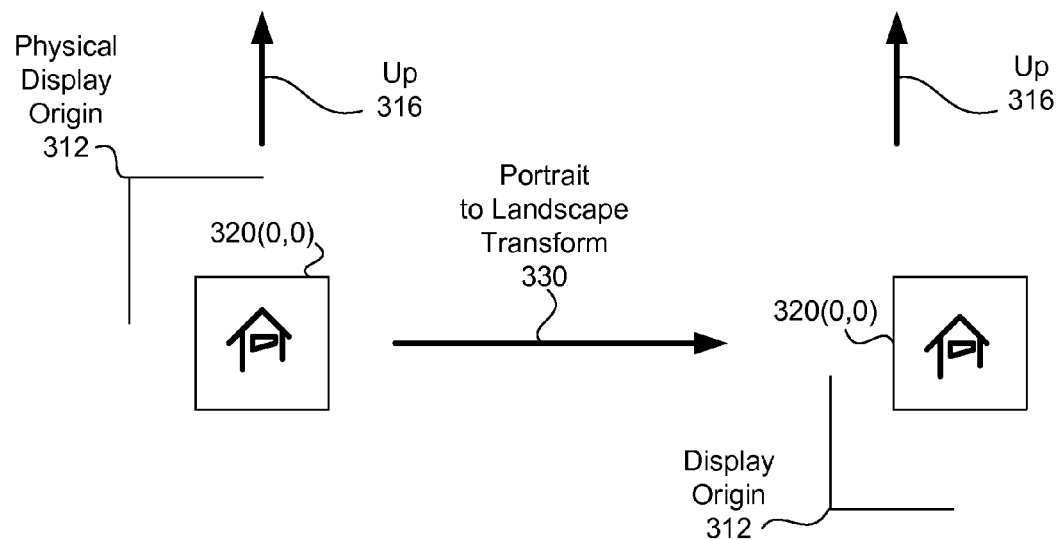
FIG. 3C illustrates one representative image in two different orientations as viewed by a user with respect to a physical up direction, according to one embodiment of the present invention.

FIG. 3C illustrates representative image 320(0,0) of FIG. 3A in two different orientations as viewed by a user, according to one embodiment of the present invention. A portrait to landscape transform 330 is implemented to animate a clockwise rotation of representative image 320(0,0) from a portrait orientation to a landscape orientation. Additional transforms may be similarly implemented to animate transitions between each different discrete rotation position. Here, representative image 320(0,0) is rotated ninety degrees in a clockwise direction to compensate for a ninety degree counter-clockwise rotation of physical display origin 312. As shown, representative image 320(0,0) is rotated to be viewable in a generally upright orientation regardless of orientation of physical display origin 312. In other embodiments, finger-grain discrete rotation positions may be similarly implemented.

Figure 3D:
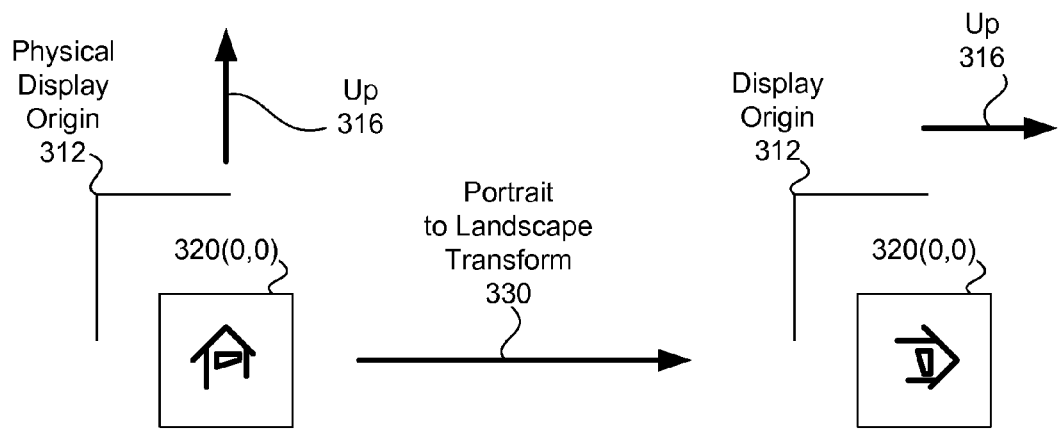
FIG. 3D illustrates one representative image in two different orientations with respect to a physical display origin, according to one embodiment of the present invention.

FIG. 3D illustrates representative image 320(0,0) in two different orientations with respect to the physical display origin 312 of FIG. 3A, according to one embodiment of the present invention. As described above, portrait to landscape transform 330 implements a rotation of representative image 320(0,0). As shown, representative image 320(0,0) is rotated relative to physical display origin 312.

Figure 3E:
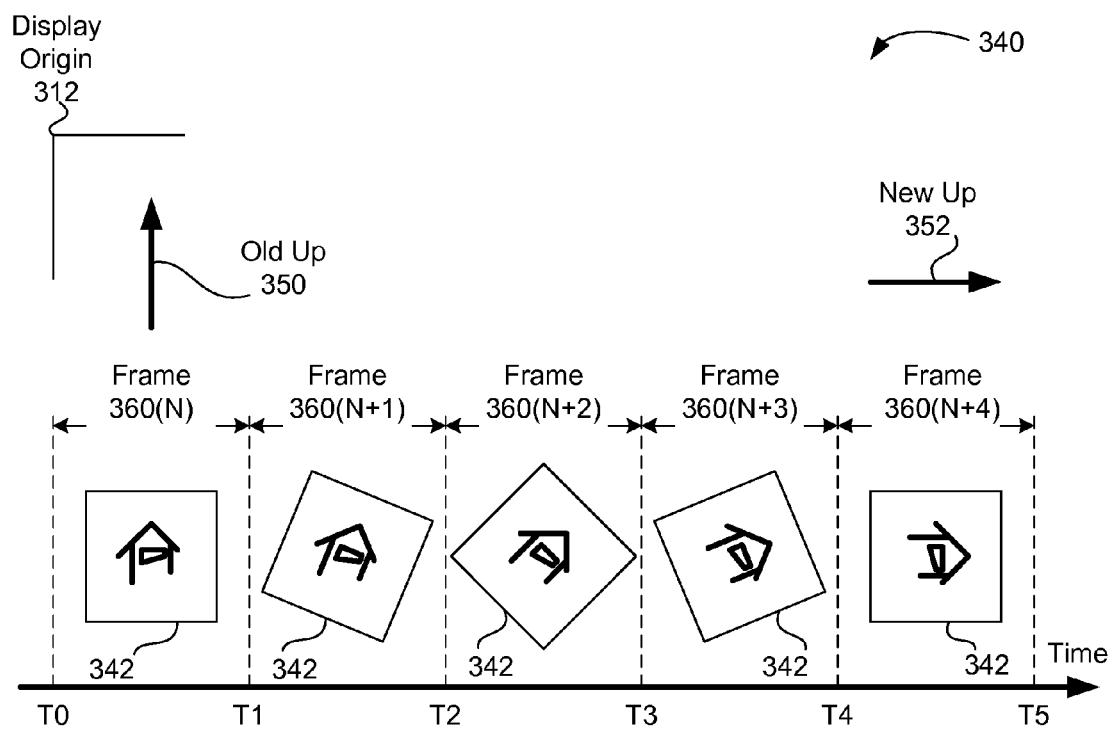
FIG. 3E depicts an animation sequence of frames for one representative image transitioning between two different orientations, according to one embodiment of the present invention.

FIG. 3E depicts an animation sequence 340 of frames 360 for one representative image transitioning between two different orientations, according to one embodiment of the present invention. As shown, a representative image 342 is rotated in sequential frames 360(N) to 360(N+4) to generate a rotation animation of representative image 342. The rotation animation depicts a rotational movement of the representative image 342 from an initial position at time T0, to a new position at time T4. In this example, a user rotates mobile device 270 counter-clockwise from a portrait orientation to a landscape orientation between time T0 and time T1, thereby triggering a clockwise animation of representative image 342. In the process, a new physical up direction is established. A new up direction 352 consequently replaces an old up direction 350. The animation sequence depicts rotational movement of representative image 342 to generally negate the physical rotation of mobile device 270. In one embodiment the animation sequence is timed independently of physical rotation once a rotation event is detected. In other embodiments, the animation sequence is timed to substantially track physical rotation once a rotation event is detected.

Representative image 342 may be rendered in each rotational position associated with each incremental frame 360. Although three intermediate frames 360(N+1), 360(N+2), and 360(N+3) are shown, animation sequence 340 may implement an arbitrary number of intermediate frames. In one embodiment, animation sequence 340 is initiated and completed during a time span of less than one second, but more than ten milliseconds. In certain implementations, duration of animation sequence 340 may be measured as an integral multiple of a number of frame times needed to display intermediate frames as refresh frames on display device 212. In one embodiment, each representative image being displayed within view panel 311 is animated substantially synchronously, so that each animation step for each representative image is completed together. For example, animation frame 360(N+1) is rendered and displayed at or before time T2 for each representative image 320 of FIG. 3A. In other embodiments, looser synchronization may be implemented, so that each representative image 220 completes a respective animation sequence within a specified maximum number frame times, such as less than five frame times, or less than sixty frame times. In certain embodiments, an animation sequence models certain physical behaviors or properties, such as momentum, oscillation, friction, and the like. For example, an animation sequence may depict the representative images overshooting their rotation and springing back into proper position. An arbitrary rotation function may be applied with respect to time to provide such effects.

In alternative embodiments, transition effects other than a rotation animation may be implemented. For example, one alternative transition effect to a rotation animation is an alpha fade animation between representative image 342 depicted in frame 360(0) and representative image 342 depicted in frame 360(N+4). Another alternative transition effect animates representative image 342 depicted in frame 360(0) collapsing to a dot and re-emerging as representative image 342 depicted in frame 360(N+4). These and other in-place transition effects may be implemented without departing the scope and spirit of the present invention.

In one embodiment, frames 360 are rendered by a graphics processing unit (GPU) within processor complex 210 of FIG. 2B.

While the techniques disclosed herein are described in conjunction with a mobile device, persons skilled in the art will recognize that any compute platform may be configured to perform these techniques.

While the foregoing is directed to embodiments of the present invention, other and further embodiments of the invention may be devised without departing from the basic scope thereof, and the scope thereof is determined by the claims that follow.

We claim:

1. A method, comprising:
    displaying, on a display unit, two or more representative images within a collection viewer, wherein each one of the two or more representative images is displayed at a different location relative to a physical origin for the display unit;
    receiving a notification indicating a new orientation for the collection viewer; and
    generating and displaying a sequence of animation frames that depict an in-place rotation animation for each of the two or more representative images, wherein each in-place rotation animation is displayed at the different location relative to the physical origin for the display unit, and wherein each animation frame in the sequence of animation frames depicts a different animation state in a sequence of animation states for the two or more representative images by:
        computing the different animation state for each animation frame in the sequence of animation frames, the animation state including at least a rotation angle;
        identifying at least the two or more representative images to render in each animation frame;
        generating a rendered representative image for each of the at least the two or more representative images, by rendering a rotation for each of the at least the two or more representative images according to the rotation angle included in the different animation state; and
        displaying each rendered representative image at the different location relative to the physical origin for the display unit;
    wherein a first timing is associated with the in-place rotation animation and a second timing is associated with a physical rotation timing, and the first timing commences after the second timing commences;
    wherein each in-place rotation animation completes a respective animation state synchronously with each other in-place rotation animation;
    wherein each in-place rotation animation is timed independently of a physical rotation once a rotation event is detected.

2. The method of claim 1, wherein the notification comprises a message in an object-based message passing system.

3. The method of claim 1, wherein the notification is generated in response to a measurement of a physical force associated with a mobile computing device.

4. The method of claim 1, wherein displaying the two or more representative images comprises identifying representative images that are visible within the collection viewer.

5. The method of claim 1, wherein the animation state includes current scroll position.

6. The method of claim 1, wherein displaying the sequence of animation frames is performed by a graphics processing unit within a mobile computing device.

7. The method of claim 1, wherein timing associated with each in-place rotation animation is based, at least in part, on tracking the physical rotation associated with the new orientation for the collection viewer.

8. The method of claim 1, wherein each in-place rotation animation starts with a first frame of the sequence of animation frames and ends with a last frame of the sequence of animation frames, wherein the last frame corresponds to the new orientation for the collection viewer.

9. The method of claim 1, wherein each in-place rotation animation completes the respective animation state in the sequence of animation states within a specified maximum number of frame times.

10. A computer program product embodied in a non-transitory computer-readable medium that, when executed by a processor, causes the processor to perform a method comprising:
    displaying, on a display unit, two or more representative images within a collection viewer, wherein each one of the two or more representative images is displayed at a different location relative to a physical origin for the display unit;
    receiving a notification indicating a new orientation for the collection viewer; and
    generating and displaying a sequence of animation frames that depict an in-place rotation animation for each of the two or more representative images, wherein each in-place rotation animation is displayed at the different location relative to the physical origin for the display unit, and wherein each animation frame in the sequence of animation frames depicts a different animation state in a sequence of animation states for the two or more representative images by:
        computing the different animation state for each animation frame in the sequence of animation frames, the animation state including at least a rotation angle;
        identifying at least the two or more representative images to render in each animation frame;

generating a rendered representative image for each of the at least the two or more representative images, by rendering a rotation for each of the at least the two or more representative images according to the rotation angle included in the different animation state; and displaying each rendered representative image at the different location relative to the physical origin for the display unit;

wherein a first timing is associated with the in-place rotation animation and a second timing is associated with a physical rotation timing, and the first timing commences after the second timing commences;

wherein each in-place rotation animation completes a respective animation state synchronously with each other in-place rotation animation;

wherein each in-place rotation animation is timed independently of a physical rotation once a rotation event is detected.

11. The computer program product of claim 10, wherein the notification comprises a message in an object-based message passing system.

12. The computer program product of claim 10, wherein the notification is generated in response to a measurement of a physical force associated with a mobile computing device.

13. The computer program product of claim 10, wherein displaying the two or more representative images comprises identifying representative images that are visible within the collection viewer.

14. The computer program product of claim 10, wherein the animation state includes current scroll position.

15. The computer program product of claim 10, wherein displaying the sequence of animation frames is performed by a graphics processing unit within a mobile computing device.

16. A mobile computing device comprising:
a display unit configured to display a collection viewer; and
a processing unit in communication with the display unit and configured to:
display two or more representative images within a collection viewer, wherein each one of the two or more representative images is displayed at a different location relative to a physical origin for the display unit;
receive a notification indicating a new orientation for the collection viewer; and
generate and display a sequence of animation frames that depict an in-place rotation animation for each of the two or more representative images, wherein each in-place rotation animation is displayed at the different location relative to the physical origin for the display unit, and wherein each animation frame in the sequence of animation frames depicts a different animation state in a sequence of animation states for the two or more representative images by:
computing the different animation state for each animation frame in the sequence of animation frames, the animation state including at least a rotation angle;
identifying at least the two or more representative images to render in each animation frame;
generating a rendered representative image for each of the at least the two or more representative images, by rendering a rotation for each of the at least the two or more representative images according to the rotation angle included in the different animation state; and
displaying each rendered representative image at the different location relative to the physical origin for the display unit;
wherein a first timing is associated with the in-place rotation animation and a second timing is associated with a physical rotation timing, and the first timing commences after the second timing commences;
wherein each in-place rotation animation completes a respective animation state synchronously with each other in-place rotation animation;
wherein each in-place rotation animation is timed independently of a physical rotation once a rotation event is detected.

* * * * *